United States Patent [19]

Grunwald

[11] 4,229,829

[45] Oct. 21, 1980

[54] APPARATUS FOR WIRELESS TRANSMISSION OF A TEACHING PROGRAM IN A CLASSROOM

[76] Inventor: Peter H. Grunwald, Bogenweg 1, 6079 Buchschlag, Fed. Rep. of Germany

[21] Appl. No.: 887,114

[22] Filed: Mar. 16, 1978

[51] Int. Cl.³ .............................................. H04B 9/00
[52] U.S. Cl. .................................. 455/600; 35/35 C; 179/156 R; 179/167; 320/2
[58] Field of Search ............ 250/199; 179/82, 156 R, 179/167, 2 A, 1 E; 320/2, 3, 4; 360/137, 69; 35/35 C

[56] References Cited

U.S. PATENT DOCUMENTS

| | | | |
|---|---|---|---|
| 2,345,472 | 3/1944 | Goldsmith | 179/2 A |
| 3,122,847 | 3/1964 | Redfield et al. | 35/35 C |
| 3,277,358 | 10/1966 | Nicholl | 320/2 |
| 3,330,955 | 7/1967 | Barecki et al. | 250/199 |
| 3,476,455 | 11/1969 | Barecki et al. | 35/35 C |
| 3,862,379 | 1/1975 | Pless | 179/156 R |
| 3,943,564 | 3/1976 | Tushinsky | 179/1 E |
| 4,097,893 | 6/1978 | Camras | 360/69 |

FOREIGN PATENT DOCUMENTS

| | | | |
|---|---|---|---|
| 2155219 | 5/1973 | Fed. Rep. of Germany | 320/2 |
| 2431937 | 1/1976 | Fed. Rep. of Germany | 250/199 |
| 892298 | 3/1962 | United Kingdom | 179/167 |
| 1254018 | 11/1971 | United Kingdom | 320/2 |

OTHER PUBLICATIONS

Sennheiser Infra-Red Headphones-Electronics Australia-Apr. 1976, vol. 38-#1-p. 25.
Conrad-Headphones, Infra-Red Stereo and Microphones-Funkschau, vol. 48, #24, pp. 1061-1062, Nov. 19, 1976.
Free-Cordless Headphones-Popular Science-Jan. 1976, p. 91.

*Primary Examiner*—Robert L. Griffin
*Assistant Examiner*—Joseph A. Orsino, Jr.
*Attorney, Agent, or Firm*—Robert E. Burns; Emmanuel J. Lobato; Bruce L. Adams

[57] ABSTRACT

Apparatus for wireless transmission of a teaching program in a classroom comprises a transmitting unit comprising a casing which houses one or more tape recorders with operating elements, a microphone and a plurality of infrared transmitters. A removable cover which can be hung on the wall has additional infrared transmitters connected by a cable to the transmitting unit. Each student has a head set with an infrared receiver, earphones and a microphone. The transmitting unit is remotely controlled by a portable ultrasonic transmitter. When not in use, the headsets are placed in a cabinet where the batteries of the headset are charged by means of induction coils on the head sets being magnetically coupled with induction coils in the cabinet to which high frequency current is supplied. The students may also have cassette recorders which, when not in use, are placed in charging chambers where power is transmitted from primary windings in the chambers to secondary windings in the cassette recorders to charge the batteries of the recorders.

7 Claims, 16 Drawing Figures

APPARATUS FOR WIRELESS TRANSMISSION OF A TEACHING PROGRAM IN A CLASSROOM

FIELD OF INVENTION

The present invention relates to apparatus for the wireless transmission of a teaching program in a classroom from teaching apparatus provided with a transmitter to the individual students each of which is provided with a head set comprising earphones and a receiver and possibly also a microphone.

BACKGROUND OF THE INVENTION

Such apparatus for the transmission of a teaching program in a classroom is known. It is sold under the designation "Sprachlabor". It requires the classroom to be provided with a number of special installations. For the teacher there is installed a special cabinet which is usually separated from the rest of the classroom by a glass wall. This brings about a separatation of the students and the teacher which in many instances has proved quite unfavorable pedagogically because it isolates the teacher from the students. If the student receiving devices are connected with the teaching apparatus by cable, the entire room must be wired which has the result that not only installation cost is high but also that the desks in the room can no longer be moved from one place to the other. The practically permanent installation despite plug-in connections interferes with use of the room for other purposes and makes difficult daily cleaning of the room. A further objection is limited flexibility particularly in "multimedia" instructions. By reason of these complexities of the system, this initially expensive equipment is rarely used in normal high schools in which it is installed because the instructor finds the manipulation of many technical operating elements too difficult in addition to his teaching activity.

Efforts to provide wireless teaching equipment with which the transmission is by radio have led to almost unsolvable problems. There are available only very few channels in the frequency spectrum for such transmission. The installations require a license. Good electrical isolation is required in the classrooms in which such equipment is installed. If two or more classrooms are provided with such equipment, it is necessary to provide shielding so that signals transmitted in one classroom do not disturb a neighboring classroom. Tuning of apparatus used in a second room to another frequency is not always possible because of the limited number of commercial frequencies available. Moreover, if different frequencies are used, this results in the disadvantage that the apparatus for one room is not interchangeable with that of the other room because it is incompatible. Because of the different numbers of students in the individual rooms, such interchange of equipment from one room to another is desirable. Apparatus with frequency selection switching is even more expensive to purchase.

For these reasons teaching equipment has been installed in which the electrical signals from the teachers cabinet to the students apparatus are transmitted by fixed wiring. However, this involves a high installation cost. The electrical wiring is expensive, makes shifting of the work tables impossible and is also, to a certain degree, reason for further susceptibility to failure of the complicated equipment.

Both of these systems have the common disadvantage that their use in a school requires movement of classes out of their classrooms to the room provided with the teaching installation. Such movement brings about a great disturbance in the school so that many schools on account of the above-indicated disadvantages and this further disadvantage decide not to purchase a "Sprachlabor".

SUMMARY OF THE INVENTION

The present invention is directed to the problem of providing apparatus for the wireless transmission of a teaching program in classrooms which not only is of moderate cost to produce but is easily transportable from one classroom to another and the transmission system of which is such that signals from the wireless transmission do not pass from one room to another and thereby give rise to disturbance.

In accordance with the invention the instruction apparatus is an infrared transmitter of which transmitting diodes project rays in at least two different directions and each student's apparatus comprises an infrared ray receiver and a demodulator preferably in the form of an infrared ray receiving diode as well as an amplifier and at least one earphone.

A transmission system which carries out the transmission of the instruction program from the instructor apparatus to the student apparatus with infrared rays has the advantage that there is no need of providing isolation means or screening means between two classrooms which are separated by a wall. Also no disturbing signals are projected out through windows. There are so many free infrared rays in the atmosphere that signals out of the instruction room into the free air do not enter another classroom.

The instruction apparatus as well as the student apparatus can be made so compact and light that all of the apparatus is readily portable. This brings about the important advantage that this system of transmission can be carried out in any classroom because the apparatus is readily portable into the classroom and readily installed and because signal transmission from one room to the other need not be feared. The use of infrared rays as the transmitting medium has the further advantage that the instructor can be given a small easily carried controlled device with an ultrasonic transmitter which he holds in his hand and with which by means of an ultrasonic receiver on the instruction apparatus he can control the instruction apparatus even when the instructor stands among his students far from the instruction apparatus. Such control apparatus with an ultrasonic transmitter can easily be made pocket size.

While the teaching apparatus according to the present invention is not larger than a normal suitcase and indeed can be made small enough to fit in a small suit case, the pocket control of the instructor provides the possibility that the teaching apparatus can also be remotely controlled namely if the teacher passes between the rows of chairs of the students during the instruction in order to observe the work of the students. He can thus conduct control operations of the teaching apparatus from a position in the midst of the rows of students. The entire equipment is extraordinarily easily movable and can easily be moved from one classroom to another even by a female teacher and after the lesson can be put in a special storage room to which students are not admitted.

The selection of infrared rays for the wireless transmission of a teaching program in classrooms as well as the selection of ultrasonic radiation for the remote control of the teaching apparatus by the instructor by means of a pocket control device that he carries avoids all of the disadvantages incident to transmission of a teaching program over cable connection or by radio namely the high expense of frequency stabilization, modulation and demodulation, screening measures that are required and high electronic expenditure. The possibility of disturbing transmission to a neighboring room is likewise eliminated. The teacher is no more isolated by being enclosed in a cabinet and the teaching apparatus is portable and can be put in a suitcase and easily carried from room-to-room. Equipment capable of simultaneous transmission with a plurality of different frequencies as is necessary if, for example, it is desired to divide the class into a plurality of groups is possible with relatively limited expense.

Preferably the teaching apparatus is installed in a case or housing whose upper side constitutes a top panel, in which the operating elements, a tape recorder, a microphone or microphone socket as well as indicating instruments are provided, also carries the transmission diodes. In this manner it is possible to design the teaching apparatus in the form of a coffer which can be easily carried from one classroom to another. It is advantageous when the transmitting diodes are arranged in three rows with their ray direction in the line of sight of the one who operates the operating elements as well as the tape recorder of the teaching apparatus. The teaching apparatus is generally placed on the instructor's desk as the instructor can then operate the operating elements as well as the tape recorder conveniently. The rays of the transmitting diodes are then directed in the direction in which the students sit.

Advantageously the rows of the transmitting diodes are arranged so that the outer rows form an obtuse angle with the middle row. In elevation the transmitting diodes are advantageously arranged so that the direction of the highest rays of the transmitting diodes is in the range of 30° to 60° to the horizontal.

In many special cases it is advantageous for the container of the teaching apparatus to be provided with a removable cover provided on its inner side with additional transmitting diodes and on its outer side with means for hanging the cover on a wall. Particularly in universities there are many teaching rooms, for example auditoriums, in which there are columns or walls projecting from the side and for use in such rooms it is advantageous to provide transmitting diodes in addition to the diodes on the upper surface of the teaching apparatus. These are then arranged on the inner side of a removable cover which can be hung on the wall of the auditorium—perhaps at some distance from the transmitting diodes of the instruction apparatus—so as to direct infrared rays also to the unfavorable positions in the auditorium.

The student apparatus preferably comprises merely a pair of headphones which are connected with one another by means of a bow and preferably a microphone mounted on the bow or on a special microphone holder. The infrared receiver is mounted on the headset advantageously on the bow or on the microphone holder so that it is not covered by the hair of the student. The ear caps of the headset accommodate an accumulator as well as electrical and electronic circuit elements which convert the received infrared signals into electrical signals and finally into acoustic signals.

The accommodation of an accumulator in the headset can be facilitated by providing on the headset an electrical contact switch which connects the electrical circuit elements with the accumulator as a current source only when the headset is put on. This permits the use of a small accumulator which can readily be accomodated in the headset. This switch can be so arranged in the earpiece that, when the headset is put on a small plate is pushed outwardly by engagement with the head or the earpiece so as to close contacts of the switch. In another embodiment, the bow of the headset is articulated with a hinge joint which moves when the headset is put on and which, by such movement, actuates a switch located at the joint in the manner that, when the headset bow is spread, the switch is actuated to provide a connection between the accumulator and the electric circuit elements while, upon removal of the headset, the bow contracts to such position that the joint is moved in a manner to open the switch so that the connection between the accumulator and the electrical or electronic circuit elements is interrupted.

Preferably the headset is provided with a connection for a tape recorder and a control device for example in the form of a connector socket. In this manner it is possible for words spoken by the student to be recorded and the recorded words can be heard again. This provides many possibilities of superimposing words spoken by the student on words from the teaching apparatus or from the teacher.

An advantage of the wireless transmission is that the receivers can be moved freely from place-to-place without hinderance. However, use of wireless transmission is limited by the energy sources with which the receivers must be provided. It will be understood that in the headset of the student only a very small accumulator or battery can be accommodated since the size of the earpiece of a headset is strictly limited. When small batteries are used they must frequently be replaced and when small accumulators are used they must be frequently charged. With known equipment the accumulators must be removed and placed in a special charging station. The present invention removes this disadvantage and provides the possibility of frequently repeated wireless charging of the accumulator in the headset of the student. There is, of course, the possibility of charging the accumulator by means of a connector socket on a tape recorder. However, the possibility of wireless charging in accordance with the present invention is advantageous. An induction coil for the accumulator charging device is built into the headset. In the storage cabinet for the headset there is likewise arranged an induction coil which represents the primary winding of a transformer while the induction coil of the accumulator of the headset acts as the secondary winding. The storage case remains in place. For example if there is a switch or outlet on a wall of the classroom, the storage cabinet can hang on the wall. It can thereby remain connected to the electrical supply circuit equally whether the headsets are removed for use or are placed in the cabinet for storage.

There exists the possibility that the induction coil of the headset is wound on a magnetic core which can be on the rim of the earphone case or on the bow of the headset. In the storage cabinet there is a ledge on which magnetic cores are arranged and wound with induction coils. The magnetic cores of the headsets can then be brought into contact with the magnetic cores on the ledge in the storage cabinet so that in this manner they form in effect a common magnetic core of a transformer of which the secondary winding is the coil of the headset and the primary winding is the coil of the storage cabinet. In view of the limited weight of the headset the magnetic force of permanent magnets used as the cores is sufficient to support the headset so that the headsets can hang from the magnets in the storage cabinet.

A similar arrangement can be used for charging the accumulators of cassette recorders used by the students. Also here induction coils provided in the storage cabinet act as primary windings to induce current in induction coils in the students' recorders, such current being rectified for use in charging the accumulators of the students' recorders.

In order for the teacher who with this transmission system can go freely between the rows of students has the possibility of controlling the instruction apparatus, it is desirable to provide an ultrasonic transmission line between the teaching apparatus and a control device carried by the teacher. For this purpose the teaching apparatus is preferably provided with an ultrasonic receiver of which the electroacoustic transducer is connected to the input of an electrical control circuit for control of the instruction apparatus. The portable control device carried by the instructor is provided with an ultrasonic transmitter of which the electroacoustic transducer is connected to the output of the electrical control circuit of the control device.

However, if an ultrasonic transmission system is selected for the wireless transmission of the teaching program an infrared transmission system will be used for transmission of control impulses transmitted to the instruction apparatus from a portable control device carried by the instructor.

BRIEF DESCRIPTION OF DRAWINGS

The nature, objects and advantages of the invention will be more fully understood from the following description of preferred embodiments shown schematically by way of example in the accompanying drawings in which.

DESCRIPTION OF PREFERRED EMBODIMENTS

Figure 1:
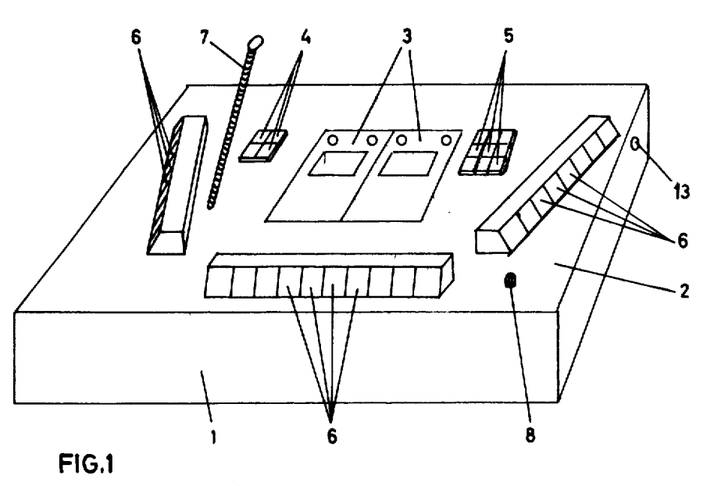
FIG. 1 is a schematic perspective view of the instruction apparatus.
Figure 2:
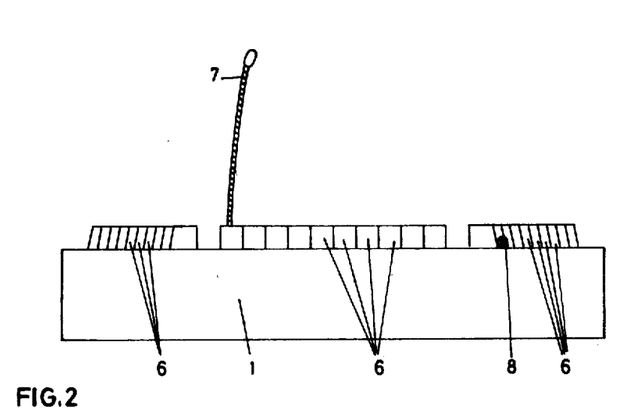
FIG. 2 is a front view of the instruction apparatus.
Figure 3:
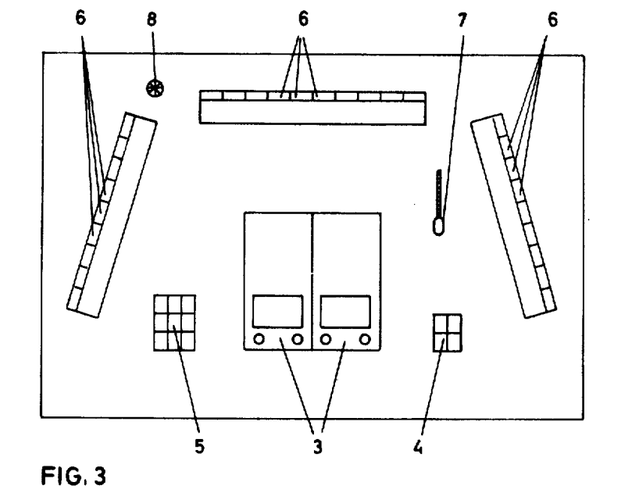
FIG. 3 is a plan view of the instruction apparatus.
Figure 4:
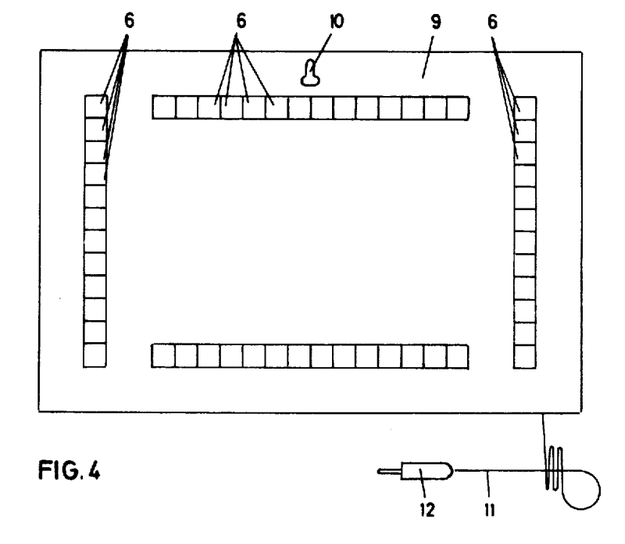
FIG. 4 is an inside view of a removable cover for the instruction apparatus.

As illustrated in FIGS. 1 to 3 the teaching apparatus is housed in a case or housing 1. Two tape recorders 3 are set into the upper surface 2 of the housing 1. Likewise two panels of operating elements 4 and 5 are set in the upper surface 2. These comprise the usual control elements and indicating instruments for the tape recorder. On the upper surface 2 there are also provided three rows of infrared transmitters 6. The rows of infrared transmitters are arranged at an obtuse angle to one another. Thus the middle row is shown parallel to the front of the case while the side rows are disposed at an angle of about 100°-120° to the middle row. The transmitters are inclined upwardly so that the direction of the lowest rays is approximately horizontal and the direction of the highest rays is in the range of 30° to 60° to the horizontal. A microphone 7 is mounted on a flexible cable which plugs into a socket in the upper surface of the case 2. An ultrasonic receiver 8 is also provided on the upper surface of the case. The case of the teaching apparatus can be closed by means of a removable cover 9 which is shown in FIG. 4. The cover has a keyhole-shaped opening 10 by means of which it can be hung on a wall hook. Further infrared transmitters 6 are provided on the inside of the cover. These are arranged in four rows parallel respectively to the sides of the cover. The infrared transmitters 6 in the cover 9 are connected with the infrared transmitters 6 on the case of the teaching apparatus by means of a cable connection 11 having a plug 12 which plugs into a socket 13 provided in the side surface of the case of the instruction apparatus. The cover 9 can be hung on the wall in a convenient location to transmit infrared signals to the receiving devices of students which by reason of the room configuration might not receive signals clearly from the central teaching apparatus.

Figure 5:
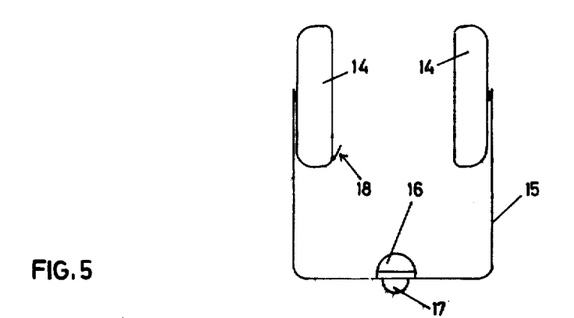
FIG. 5 is a schematic view of a student's headset.

The students apparatus is shown schematically in FIG. 5. This is a headset comprising two headphones 14 which are connected with one another by a spring bow 15. An infrared receiving diode 17 is carried by the bow which may also be provided with a microphone 16. The bow 15 is here formed as an under-the-chin bow. The infrared receiving diode 17 is thereby located at an angle in front of the chin of the student and hence will not be covered by the student's hair. On the inner edge of one of the earphones 14 a contact switch 18 is provided. When the headset is put on, the contact switch 18 is pressed by engagement with the ear or head of the student so as to close the switch and thereby connect the electronic circuitry of the student apparatus with an accumulator which is built into the case of one of the earphones. When the student removes the headset, the spring contact of the contact switch 18 is lifted off of the other contacts so that the connection between the accumulator and the electronic circuitry of the headset is interrupted. This electronic circuitry comprises the infrared receiver 17, a demodulator, an amplifier, and a speaker in each of the earphones.

Figure 6:
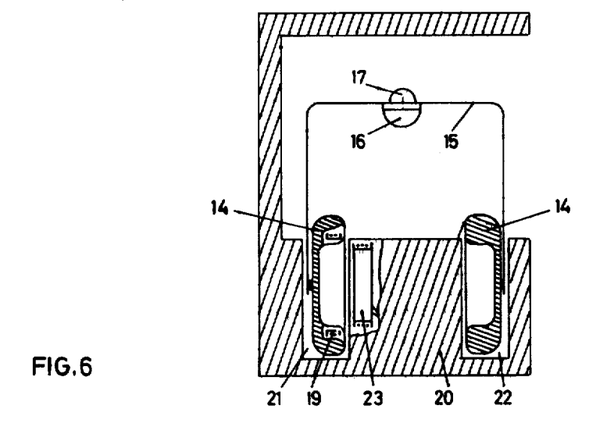
FIG. 6 is a cross section of a storage and charging cabinet for students' headsets as shown in FIG. 5.
Figure 7:
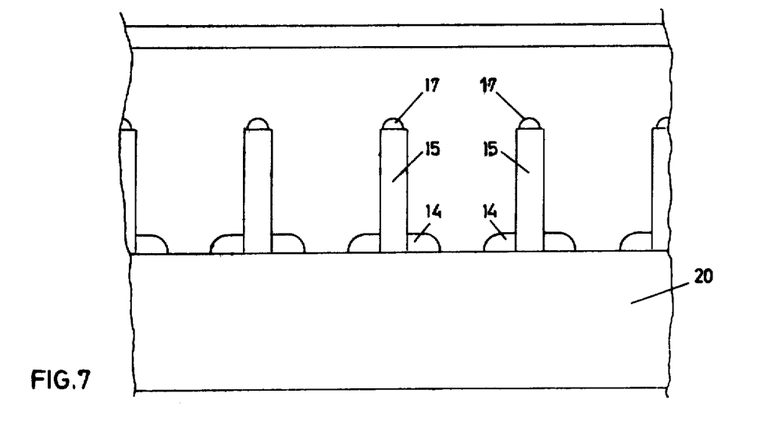
FIG. 7 is a partial front view of the storage and charging cabinet of FIG. 6.

In order to charge the accumulator of the headset without wire connections, each headset is provided with an induction coil 19 which is installed in the shell of one of the earphones 14 (FIG. 6). After the conclusion of a teaching session the student apparatus is placed in a storage cabinet 20 which has separate compartments 21,22 for the two earphones of each headset. The built-in accumulator of the headset is thereupon charged by means of an induction coil 23 in the storage cabinet as the primary winding and the induction coil 19 of the headset as the secondary winding of a transformer. The current thereby induced in the secondary winding 19 is rectified by the rectifier of a charging device and the rectified current is applied to the built-in accumulator to charge it. As the inductive coupling between the induction coil 23 and the induction coil 19 may not be sufficient for satisfactory functioning, a higher frequency is preferably used. For this purpose the storage and charging cabinet 20 has a circuit fed by a generator for producing the desired frequency and each of the induction coils 23 of the cabinet is connected to this circuit.

Figure 8:
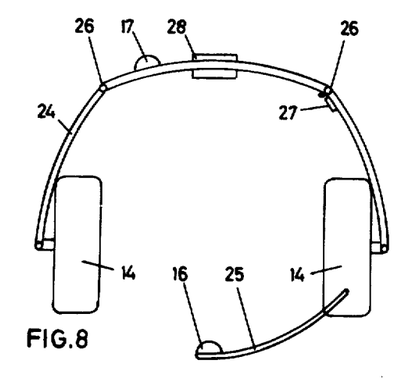
FIG. 8 is a front view of another embodiment of the headset shown in position of use.
Figure 9:
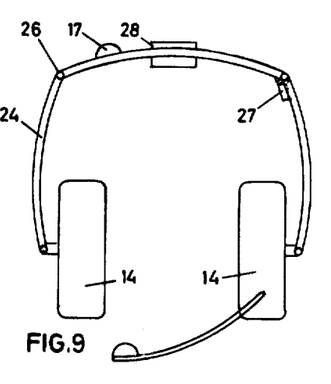
FIG. 9 is a front view of the headset of FIG. 8 shown in position when not in use.

FIGS. 8 and 9 illustrate schematically another embodiment of the headset comprising two earphones 14 connected by a bow 24 and a microphone holder 25 for the microphone 16. The bow 24 is articulated and comprises three links connected by hinge joints 26. In the nonoperative position, the two earphones 14 can thereby lie close to one another so that this headset occupies very little room when not is use. The hinge joints 26 have limited pivotal movement so that they can swing only so far that the distance between the earphones 14 is always less than the diameter of a student's head. However, the head bow 24 has sufficient elasticity that the earphones 14 are clamped snugly against the ears of the student. A contact switch 27 is arranged on one of the hinge joints 26 so as to be in operative condition so long as the headset is on a student's head. When the headset is removed, the two earphones 14 move toward one another to the position shown in FIG. 9 so that the contact switch 27 is in inoperative position in which the connection between the electronic circuit of the student apparatus and the accumulator is interrupted.

Figure 10:
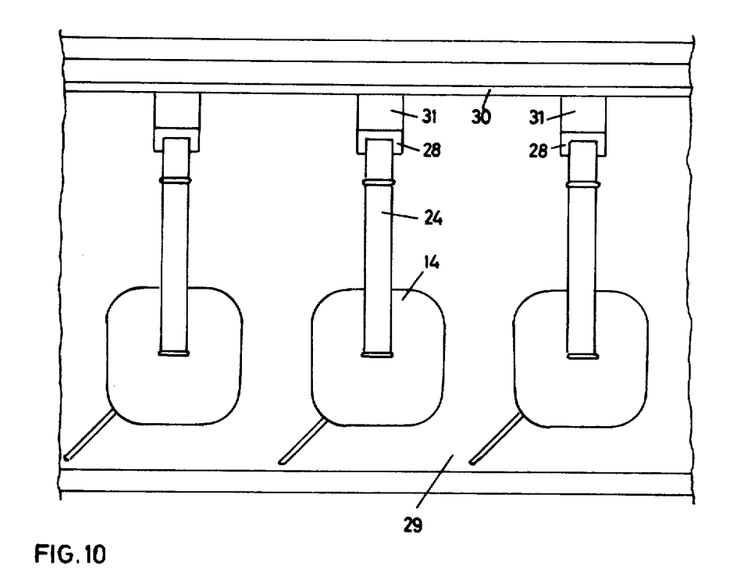
FIG. 10 is a schematic partial front view of a storage and charging cabinet for the students' headsets as shown in FIGS. 8 and 9.

On the central link of the bow 24 between the two hinge joints 26 there is an induction coil 28 which is wound on a magnet core. As shown in FIG. 10, a storage and charging cabinet 29 for the headsets has in its interior a ledge or rail 30 provided with many magnet cores 31 downwardly facing on each of which an induction coil is wound. In order to charge the accumulators in the earphones 14 of the headsets, the magnetic cores of the induction coils 28 of the headsets are into contact with the magnetic cores 31 of the storage cabinet so that headsets are suspended from the magnetic cores 31 by means of magnetic force provided by residual magnetism or by making at least one of the cores as a permanent magnet. There is thereby provided an iron core transformer of which the primary winding is the winding on the magnet core 31 while the secondary winding is the winding 28 on the bow of the headset. As in the previously described embodiment, alternating current is supplied to the windings on the magnetic cores 31, thereby inducing current in the windings 28 of the headsets. The current thus induced is rectified and applied to charge the accumulators of the headsets. The coil of the winding 28 can be very small if the winding is correspondingly small. With this arrangement it is possible to use a current supply of 50 or 60 cycles without problem.

Figure 11:
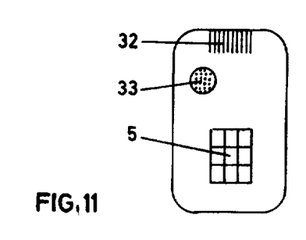
FIG. 11 is a schematic view of the teachers control device.

In FIG. 11 there is shown schematically a control device which is carried by the instructor so as to provide for remote control of the teaching apparatus thereby permitting the instructor to pass between the rows of the students during the instruction. The control device comprises operating elements 5 corresponding to the operating elements of the tape recorder of the instruction apparatus and an ultrasonic transmitter 32 for transmitting signals from the remote control device to the ultrasonic receiver 8 of the teaching apparatus. Moreover, the control device is provided with a microphone 33. Signals generated by the operating elements 5 and by the microphone 33 are converted into ultrasonic signals which are transmitted by the ultrasonic transmitter 32 of the remote control device to the ultrasonic receiver 8 of the instruction apparatus. With this remote control device the teacher can, by means of the operating elements 5, control the teaching apparatus even when the instructor is in the classroom between the rows of students.

Figure 12A:
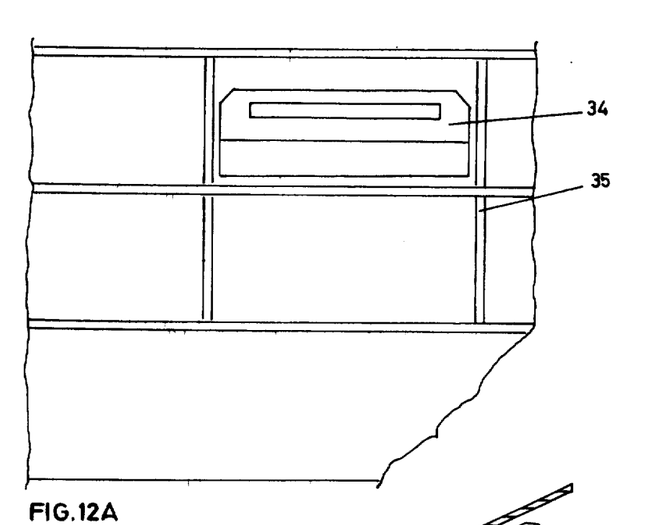
FIG. 12A is a schematic fragmentary front view of a storage and charging cabinet for students' cassette recorders.
Figure 12B:
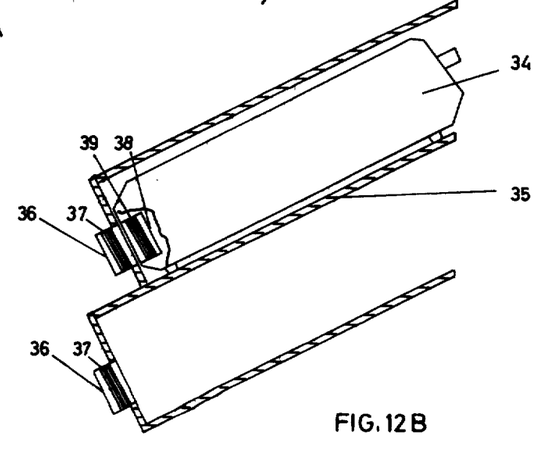
FIG. 12B is a cross section of the storage and charging cabinet shown in FIG. 12A.

There is the possibility that each student's apparatus can be connected by means of a cable with a tape recorder and control device for example a cassette recorder 34. The power source of each cassette recorder 34 is preferably an accumulator which is periodically charged by inductively supplied current in the manner described with respect to the accumulators of the headsets. For this purpose there is provided a storage and charging cabinet 35 having compartments in which the cassette recorders are stored at an angle as illustrated in FIG. 12B. At the lower and inner ends of the compartments there are provided primary induction coils 37 wound on iron cores 36 and supplied with alternating current. Each of the cassette recorders 34 is provided at its rear end with an iron core 38 on which an induction coil 39 is wound. The iron cores 36 and 38 are positioned so that they engage one another as illustrated in FIG. 12B when the cassette recorder is placed in a compartment. Thus the two cores 36 and 38 work magnetically as a single core of a transformer of which the induction coil 37 forms the primary winding and the induction coil 39 forms the secondary winding. Thus when alternating current is supplied to the induction coils 37 current is induced in the induction coils 39 of the cassette recorders. This is rectified and supplied to the accumulators of the respective cassette recorders to charge them when the recorders are placed in the compartments of the storage and charging cabinet 35. Accumulators of the recorders are thereby charged without the need of wire connections.

Figure 13:
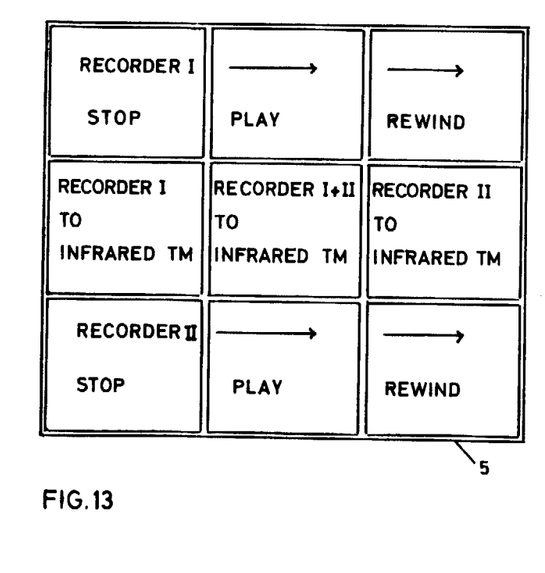
FIGS. 13 and 14 are details of controls.

An arrangement of the operating elements 5 on the upper surface of the case 1 of the teaching apparatus is shown by way of example in FIG. 13. It will be seen that the control panel comprises three keys for controlling the first controller designated "RECORDER I", three keys for determining whether the first recorder, the second recorder or both recorders are connected to the infrared transmitter and three keys for controlling the second recorder identified as "RECORDER II".

Figure 14:
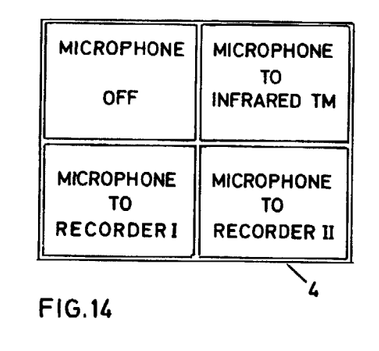

FIG. 14 shows by way of example an arrangement of the panel comprising operating elements 4. As will be seen from FIG. 14 this panel comprises operating elements for controlling the microphone 7 and includes a key for turning the microphone off, a second key for connecting the microphone to the infrared transmitter, a third key for connecting the microphone to RECORDER I for recording on said recorder and a fourth key for connecting the microphone to RECORDER II for recording on the second recorder. It will be understood that the keys are pressed in usual manner in order to effect the designated functions.

Figure 15:
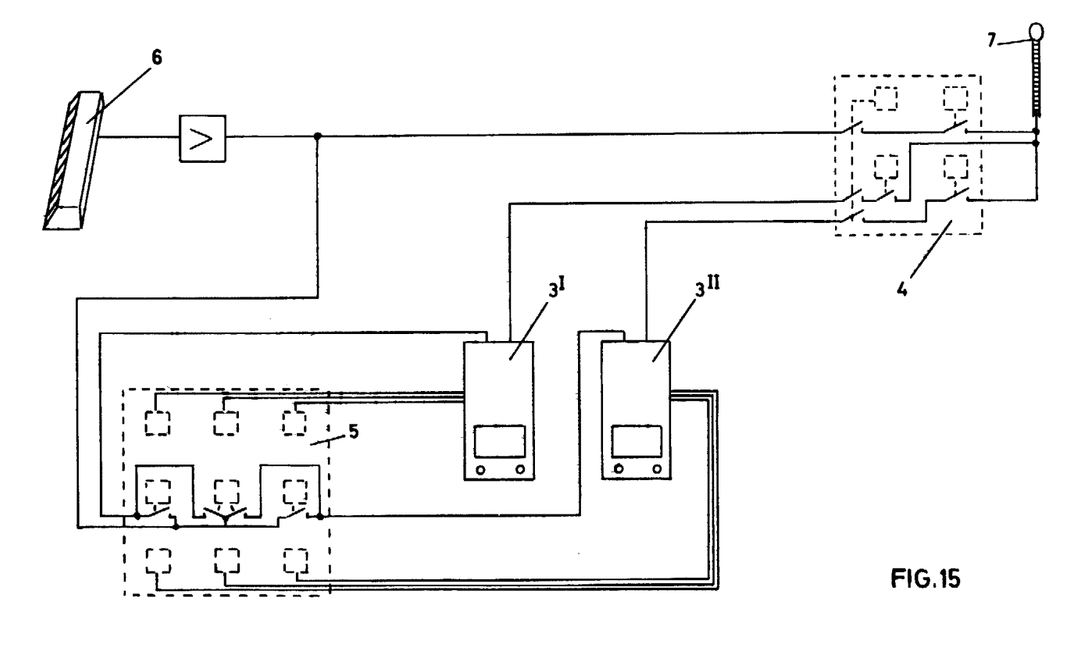
FIG. 15 is a circuit diagram of the instruction apparatus.

FIG. 15 shows schematically circuitry of the teaching apparatus. In FIG. 15 the two recorders are designated by the references numerals 3$^I$ and 3$^{II}$ respectively. As will be seen from FIG. 15, the panel of operating elements 5 provides for controlling the recorders and connecting them with the infrared transmitter 6 as described above while the panel of operating elements 4 provides for controlling the microphone 7 as described. It will be understood that the infrared transmitter comprises transducing means for converting electrical signals of audio frequency from the recorders and/or the microphone to infrared signals and appropriate amplifying means.

While preferred embodiments of the invention have been shown by way of example in the drawings it will be understood that many variations and modifications are possible and that the invention is hence in no way limited to the illustrated embodiments.

What I claim is:

1. Apparatus for the wireless transmission of an instruction program in a classroom, comprising a transmitting unit comprising a portable prismatic carrying case the size and shape of a suitcase adapted to rest on a table or desk in a flat position with one side of said case forming a top panel, at least one recording unit with operating elements, and an infrared transmitter for transmitting a recorded program from said recording unit housed in said case, said transmitter comprising a plurality of infrared transmitting diodes mounted on said top panel of said case and directed in at least two directions, and operating elements and indicating elements for said infrared transmitter and said recording unit mounted on said top panel, a plurality of receiving units for individual students in the classroom, each of said receiving units comprising a headset comprising earphones connected by a bow, an infrared receiving diode mounted on said bow, a demodulator for signals received by said receiving diode, an amplifier for the demodulated signal and transducers in said earphones to convert an electrical signal output of said amplifier to a sound signal, each of said receiving unit including an accumulator providing power for electronic circuitry of said receiving unit, said accumulator and electronic circuitry of said receiving unit being housed in said earphones, and built-in means for charging said accumulator, said charging means comprising an induction coil on the bow of said headset with an upwardly facing magnetic core and means for rectifying current induced in said coil and supplying the rectified current to said accumulator to charge it, and a storage cabinet for said receiving units, said storage cabinet having therein a horizontally extending rail and a plurality of induction coils on said rail with downwardly facing magnetic cores in position to be magnetically coupled with said induction coils of said receiving units when placed in said storage cabinet, said magnetic cores of said headset and said storage cabinet having sufficient magnetic force to suspend said headsets from said induction coils in said storage cabinet by the mutual attraction of said cores, said induction coils of said storage cabinet serving as primary windings to induce current in said induction coils of the receiving units.

2. Apparatus for the wireless transmission of an instruction program in a classroom, comprising a transmitting unit comprising a portable prismatic carrying case the size and shape of a suitcase adapted to rest on a table or desk in a flat position with one side of said case forming a top panel, at least one recording unit with operating elements, and an infrared transmitter for transmitting a recorded program from said recording unit housed in said case, said transmitter comprising a plurality of infrared transmitting diodes mounted on said top panel of said case and directed in at least two directions, and operating elements and indicating elements for said infrared transmitter and said recording unit mounted on said top panel, a plurality of receiving units for individual students in the classroom, each of said receiving units comprising a headset comprising earphones connected by a bow, an infrared receiving diode mounted on said bow, a demodulator for signals received by said receiving diode, an amplifier for the demodulated signal and transducers in said earphones to convert an electrical signal output of said amplifier to a sound signal, each of said receiving units including an accumulator providing power for electronic circuitry of said receiving unit, said accumulator and electronic circuitry of said receiving unit being housed in said earphones, and built-in means for charging said accomulator, said charging means comprising an induction coil in said headset and means for rectifying current induced in said coil and supplying the rectified current to said accumulator to charge it, said induction coil being disposed in one of said earphones, and a storage cabinet having separate compartments for the two earphones of each headset and having an induction coil adjacent each compartment for a headphone in which said induction coil is disposed, said induction coils of said storage cabinet serving as primary windings to induce current in said induction coils in said headphones of said receiving units.

3. Apparatus according to claim 1 or 2, in which a contact switch connecting said accumulator with electronic circuitry of said receiving unit is located on the inner edge of one of said earphones in position to contact the ear or head of a student wearing said headset to operate said switch to connect said circuitry to said accumulator when said headset is in operative position on the head of a student and to disconnect said circuitry from said accumulator when the headset is removed.

4. Apparatus according to claim 1 or 2 in which said bow of the receiving unit is articulated with a plurality of links connected by at least one hinge joint, and in which a contact switch connecting said accumulator with electronic circuitry of said receiving unit is located at said hinge joint in position to be operated by hinge movement of said joint to connect said circuitry to said accumulator when said bow is expanded by the headset being placed on the head of a student and to disconnect said circuitry from said accumulator when said bow contracts upon the headset being removed.

5. Apparatus for the wireless transmission of an instruction program in a classroom, comprising a transmitting unit comprising a portable prismatic carrying case the size and shape of a suitcase adapted to rest on a table or desk in a flat position with one side of said case forming a top panel, at least one recording unit with operating elements, and an infrared transmitter for transmitting a recorded program from said recording unit housed in said case, said transmitter comprising a plurality of infrared transmitting diodes mounted on said top panel of said case and directed in at least two directions, and operating elements and indicating elements for said infrared transmitter and said recording unit mounted on said top panel, a plurality of receiving units for individual students in the classroom, each of said receiving units comprising a headset comprising earphones connected by a bow, an infrared receiving diode mounted on said bow, a demodulator for signals received by said receiving diode, an amplifier for the demodulated signal, transducers in said earphones to convert an electrical signal output of said amplifier to a sound signal, and a microphone mounted in position to receive the voice of a student wearing the headset, a tape recorder for each student and means for selectively connecting said tape recorder with said infrared receiver and with said microphone of said headset, and a storage cabiment for said students' tape recorders, each of said tape recorders including an accumulator and means for charging said accumulator, said charging means comprising an induction coil mounted in the rear of said tape recorder and means for rectifying current induced in said coil and supplying the rectified current to said accumulator, and said storage cabinet having compartments to receive said tape recorders, said compartments being inclined downwardly and rearwardly and having induction coils at the lower ends of said compartments in position to be magnetically coupled with said induction coils of said tape recorders when storaged in said cabinet, said induction coils of said storage cabinet serving as primary windings to induce current in said induction coils of said tape recorders.

6. Apparatus for the wireless transmission of an instruction program in a classroom, comprising a transmitting unit comprising a portable prismatic carrying case the size and shape of a suitcase adapted to rest on a table or desk in a flat position with one side of said case forming a top panel, at least one recording unit with operating elements, and an infrared transmitter for transmitting a recorded program from said recording unit housed in said case, said transmitter comprising a plurality of infrared transmitting diodes mounted on said top panel of said case and directed in at least two directions, and operating elements and indicating elements for said infrared transmitter and said recording unit mounted on said top panel, a plurality of receiving units for individual students in the classroom, each of said receiving units comprising a headset comprising earphones connected by a bow, an infrared receiving diode mounted on said bow, a demodulator for signals received by said receiving diode, an amplifier for the demodulated signal and transducers in said earphones to convert an electrical signal output of said amplifier to a sound signal, and a removable cover for said case, said cover having a plurality of infrared transmitting diodes on its inner side, a plug-in cable for connecting said diodes of the cover to said transmitting unit and means for hanging said cover on a wall in position to direct said transmitting diodes of said cover toward students in the classroom, said transmitting diodes inside said cover being arranged in four rows parallel respectively to the four sides of said cover and spaced inwardly from respective sides of said cover.

7. Apparatus for the wireless transmission of an instruction program in a classroom comprising:

a transmitting unit comprising a portable prismatic carrying case the size and shape of a suitcase adapted to rest on a table or desk in flat position with one side of the case forming a top panel, an infrared transmitter housed in said case, a microphone mounted on said top panel of said case, a tape cassette recorder set in said top panel of said case, indicating instruments and control elements arranged on said top panel of said case including control elements for said infrared transmitter, for said tape cassette recorder and for selectively connecting said microphone with said tape cassette recorder and selectively connecting said microphone and said tape cassette recorder with said transmitter, and a plurality of transmitting diodes mounted on said top panel of said case and connected with said infrared transmitter, said diodes being arranged in three rows comprising a middle row extending along a front edge of said top panel parallel to front edge and facing forwardly and two side rows extending along opposite side edges of said top panel respectively and inclined at an obtuse angle of about 100° to 120° to said middle row, said transmitting diodes being inclined upwardly so that lower rays of said transmitting diodes are approximately horizontal and upper rays of said transmitting diodes are inclined upwardly at an angle of 30° to 60° to the horizontal, and a plurality of receiving units for individual students in the classroom, each of said receiving units comprising a headset comprising earphones connected by a bow, an infrared receiving diode mounted on said bow, a demodulator for signals received by said receiving diode, an amplifier for the demodulated signal and transducers in said earphones for converting an electrical signal output of said amplifier to a sound signal.

* * * * *